United States Patent [19]

Harvey

[11] Patent Number: 4,470,684
[45] Date of Patent: Sep. 11, 1984

[54] ENERGY EFFICIENT CHARGING APPARATUS FOR AN ELECTRONIC FLASH

[75] Inventor: Donald M. Harvey, Webster, N.Y.

[73] Assignee: Eastman Kodak Company, Rochester, N.Y.

[21] Appl. No.: 484,118

[22] Filed: Apr. 11, 1983

[51] Int. Cl.³ .............................................. G03B 15/05
[52] U.S. Cl. ................................ 354/413; 354/145.1; 354/149.11
[58] Field of Search .............. 354/400, 413, 415, 418, 354/403, 420–423, 145.1, 149.11; 315/241 P

[56] References Cited

U.S. PATENT DOCUMENTS

| Re. 28,025 | 5/1974 | Murata | 315/151 |
|---|---|---|---|
| 2,901,671 | 8/1959 | Most | 315/219 |
| 3,296,947 | 1/1967 | Engelsmann | 95/1 |
| 3,599,552 | 8/1971 | Harvey | 354/403 |
| 3,748,974 | 7/1973 | Cochran | 352/14 |
| 3,836,920 | 9/1974 | Uchiyama et al. | 354/421 X |
| 3,857,064 | 12/1974 | Vital | 315/159 |
| 4,095,241 | 6/1978 | Matsumoto | 354/413 X |
| 4,159,870 | 7/1979 | Corey | 354/32 |
| 4,299,464 | 11/1981 | Cushman | 354/137 |
| 4,348,087 | 9/1982 | Ellin | 354/149 |
| 4,361,387 | 11/1982 | Cloutier | 354/173 |
| 4,361,389 | 11/1982 | Monks | 354/267 |

Primary Examiner—William B. Perkey
Attorney, Agent, or Firm—Dennis P. Monteith

[57] ABSTRACT

A camera having electronic flash apparatus for flash photography includes a rangefinder for measuring distance to a subject to be photographed, and circuitry for regulating a DC to DC converter to limit charging of the flash apparatus to a voltage corresponding to flash illumination that is necessary to effect a predetermined flash exposure of a subject situated at the distance measured by the rangefinder.

5 Claims, 3 Drawing Figures

ENERGY EFFICIENT CHARGING APPARATUS FOR AN ELECTRONIC FLASH

FIELD OF THE INVENTION

The invention relates to flash photography. More particularly, the invention relates to apparatus for automatically controlling the charging of a camera's electronic flash as a function of the distance between the camera and a subject to be photographed.

DESCRIPTION OF THE PRIOR ART

The term "energy efficient" as used herein with respect to electronic flash charging apparatus shall mean and refer to the ratio of (1) useful energy delivered to a flash tube to produce a desired flash exposure, to (2) total energy drawn from a power source for the charging of the flash apparatus for that exposure.

U.S. Pat. Nos. 4,361,387 and 4,361,389, which are both assigned to the assignee of the present invention, and U.S. Pat. No. 4,348,087 disclose apparatus for automatically charging an electronic flash unit to a fully charged condition. The flash is charged, until a predetermined, relatively high DC voltage is reached, in response to both (1) readying an associated camera in anticipation of implementating an exposure, for example by opening a lens cover, and (2) actuating a shutter button to actually initiate an exposure cycle.

Charging apparatus of this type is intended to minimize energy drawn from a battery without requiring the entire charging to occur as a preliminary step in the exposure cycle. The charging in response to actuating the shutter button replaces any charge which may have leaked from the flash unit during the intervening time the charging apparatus was off, after termination of the initial charging. Although this charging apparatus can operate to provide a fully charged flash without appreciably delaying an exposure, a fully charged flash unit is not required unless the photographic subject is located at the maximum flash distance. Thus, for close-up and normal-range flash exposures, electrical energy is unnecessarily consumed, and unacceptable flash overexposure may occur.

U.S. Pat. Nos. Re. 28,025 and 3,857,064 disclose so-called energy-saving flash units. These flash units, as with the prior art flash units disclosed above, are intended to be fully charged independently of subject distance. However, for a subject at less than the maximum flash distance, energy-saving units use only enough energy to provide a predetermined amount of flash exposure light. Any flash energy that is not needed is retained on a flash-firing capacitor, and can be used for a subsequent flash. Thus, an energy-saving flash unit can be energy efficient. However, a flash unit of this type is additionally complex and more costly. Furthermore, leakage current from a capacitor varies in proportion to capacitor voltage. If a fully charged flash unit is fired infrequently, substantial charge is wasted during the intervening time between pictures.

U.S. Pat. Nos. 2,901,671 and 3,296,947 disclose manually focusable cameras having electronic flash apparatus which is charged according to the focus setting of the camera. Thus, flash-firing voltage is adjusted to provide flash illumination according to subject distance, rather than to meet a constant maximum light output.

The flash apparatus disclosed in U.S. Pat. No. 2,901,671 suffers from the disadvantage that if the next flash exposure is to be made of a subject situated at a shorter distance from the camera than that indicated by the prior focus setting, the flash unit automatically overcharges.

The flash apparatus of U.S. Pat. No. 3,296,947 deals with this problem by causing the discharging of the flash apparatus while the camera is refocused for the next exposure, then recharging it to the appropriate voltage corresponding to the new subject distance. However, this charging arrangement is not energy efficient because the energy drawn from the flash power source prior to the refocusing of the camera is wasted. Thus, whenever the camera is caused to be refocused, the cumulative amount of energy drawn from the power source is disproportionate to the amount of energy actually delivered to the flash tube.

SUMMARY OF THE INVENTION

In view of the foregoing, an object of this invention is to overcome the aforementioned overcharging problem of the prior art and, in so doing, minimize the cumulative amount of energy drawn from a power source for each flash-firing operation. This object is achieved by photographic apparatus including circuit means, which is responsive to an electrical output signal of automatic rangefinding means that corresponds to distance to a subject to be photographed, for limiting the charging of electronic flash apparatus to a voltage corresponding to the distance measured by the rangefinding means. Because charging of the flash apparatus is independent of subject distance of a prior photographic operation, the flash apparatus does not overcharge, as can occur with the aforementioned U.S. Pat. No. 2,901,671. Furthermore, the cumulative amount of electrical energy that is drawn from a flash power source for each flash-firing operation is minimized, which is not the case with the aforementioned U.S. Pat. No. 3,296,947.

In a preferred embodiment, the photographic apparatus includes an associated camera having an automatic rangefinder for producing a signal corresponding to distance to a subject to be photographed, and the electronic flash apparatus includes a flash tube, a capacitor arranged to discharge through the flash tube to produce flash illumination corresponding to voltage stored by the capacitor, and a charging circuit for charging the capacitor. The circuit means, which includes a microprocessor and which is responsive to the signal produced by the rangefinder, causes the charging circuit to limit the charging of the capacitor to a voltage corresponding to flash illumination that is necessary to effect a predetermined flash exposure of a subject located at the distance measured by the rangefinding means.

A further feature of a preferred embodiment of the invention includes the charging of the capacitor in accordance with subject distance without requiring the entire charging to occur after distance is measured. The circuit means of the present invention is further responsive to the preparing of the camera for a photographic operation, for regulating the charging circuit to charge the capacitor initially only to a minimum voltage that is necessary to cause the flash tube to fire. Thus, the rangefinder, which is responsive to the subsequent actuation of the camera to actually initiate a photographic cycle, measures the distance between the camera and the photographic subject, and the circuit means regulates the charging circuit in response to the signal produced by the rangefinder to charge the capacitor from the aforementioned minimum voltage to the voltage corresponding to flash the distance measured by the rangefinder.

The invention and its advantages will become more apparent in the detailed description of preferred embodiments presented below.

DESCRIPTION OF THE DRAWINGS

In the detailed description of a preferred embodiment of the invention presented below, reference is made to the accompanying drawings, in which.

DETAILED DESCRIPTION OF A PREFERRED EMBODIMENT

Because photographic cameras and electronic flash apparatus are well known, the present description will be directed in particular to elements forming part of, or cooperating directly with, apparatus in accordance with the present invention. It is to be understood that camera and flash apparatus elements not specifically shown or described may take various forms well known to those having skill in the art.

Figure 1:
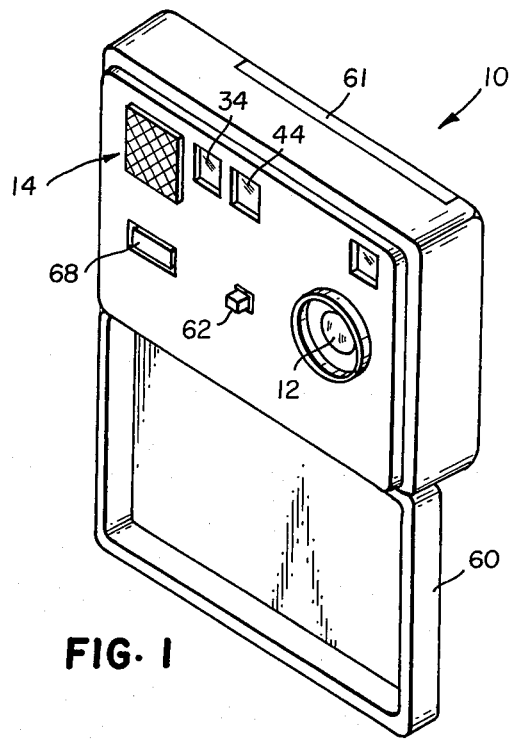
FIG. 1 is a perspective view of a camera having an electronic flash unit.

Referring to FIG. 1, a camera 10 has a lens 12 mounted along a picture-taking axis intersecting the camera's exposure plane. An electronic flash unit 14 is formed either as an integral part of the camera 10, as shown, or, alternatively, may be attachable to the camera.

In dark ambient light conditions, the camera 10 and the flash unit 14 cause a so-called "optimum" photographic flash exposure of a subject which may be, for example, approximately 2.7 meters from the camera 10. For example, this may assume a film having an ISO speed of 200/24°, subject reflectivity of about 20 percent, an f/2.8 exposure aperture, and a fully charged flash unit.

Figure 2:
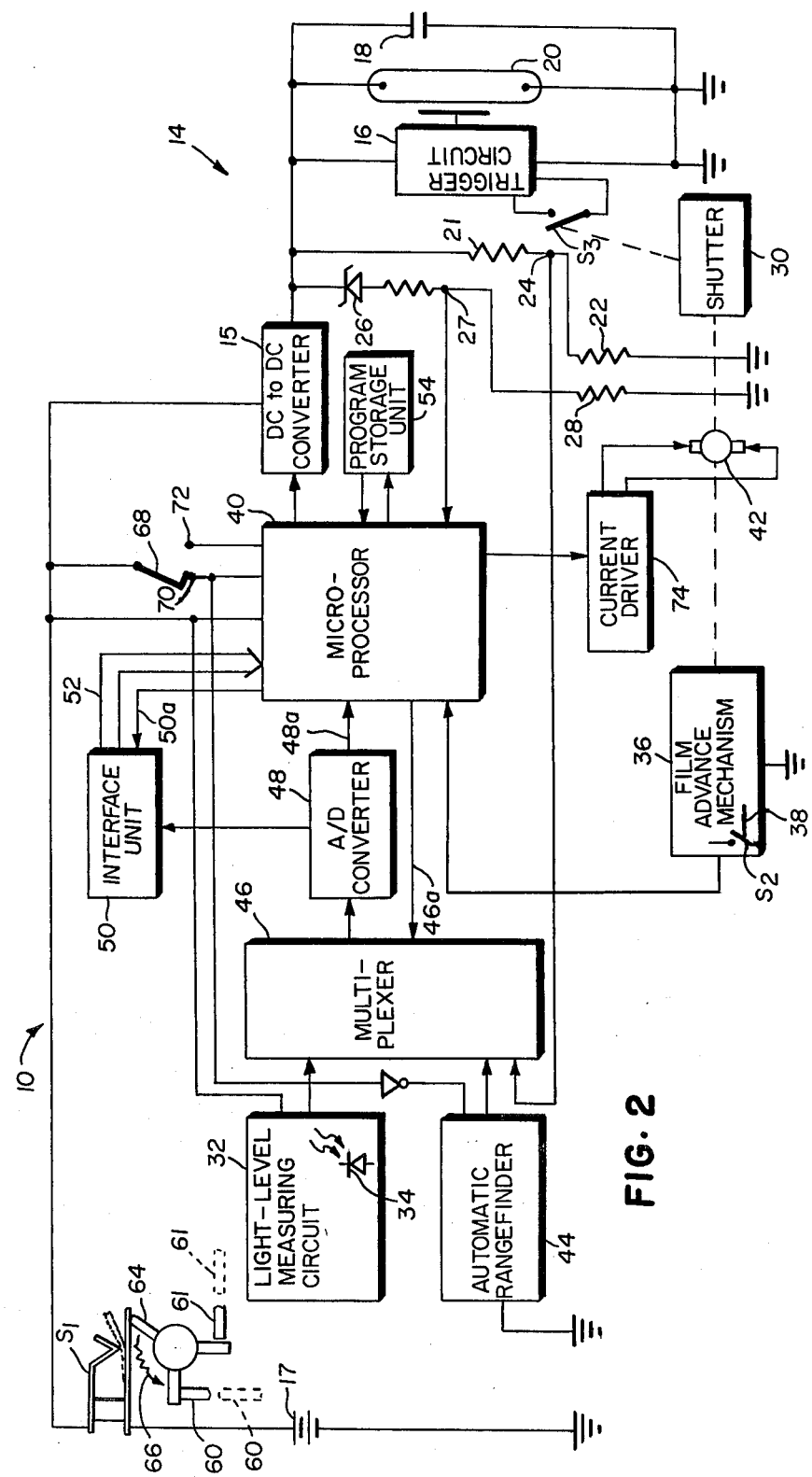
Fig. 2 is a schematic, partly in block form, of the camera and flash unit of FIG. 1.

Referring now to FIG. 2, the flash unit 14 includes a DC to DC converter 15 and a conventional trigger circuit 16. The converter 15, which is powered by a low-voltage battery 17, operates to charge a flash-firing capacitor 18 to a relatively high voltage for flashing a flash tube 20.

The flash unit 14 includes a pair of resistors 21 and 22, which are serially connected in parallel with the capacitor 18. These resistors serve to form a voltage at their common junction 24 that is a predetermined fraction of the voltage across the capacitor 18.

Also connected in parallel with the capacitor 18 is a zener diode 26 and a serially connected resistor 28. A zener diode, as is well known in the art, is a voltage-sensitive device that has high conductivity when a predetermined voltage is applied to its cathode. The zener diode 26 is selected so that it conducts when the capacitor 18 is charged to a predetermined minimum voltage that is necessary to cause the flash tube 20 to flash.

The camera 10 includes a shutter 30 for regulating an exposure interval. Preferably, the shutter 30 regulates an exposure interval automatically in accordance with ambient light intensity. Shutters of this type are, of course, well known in the photographic art and may be any of a variety of well known mechanisms. For example, U.S. Pat. No. 3,748,974, which is assigned to the assignee of the present invention, discloses camera apparatus for automatically adjusting shutter speed over a range of values as a function of scene illumination, and the aforementioned U.S. Pat. No. 4,361,387 discloses camera apparatus for automatically adjusting shutter speed at either of two predetermined values depending upon whether ambient light intensity is above or below a given level.

So that the shutter 30 can control exposure as a function of ambient light, light-level measuring circuitry 32, which includes a photodiode 34, operates to provide an output voltage proportional to the intensity of ambient light impinging on the photodiode. Preferably, the photodiode 34 is connected between inverting and noninverting input terminals of an operational amplifier (not shown). A feedback resistor (also not shown) is connected between the output of the operational amplifier and the inverting terminal of the operational amplifier so that a voltage corresponding to photodiode current, and thereby corresponding to the intensity of light impinging on the photodiode 34, is produced at the output of the amplifier. Light-measuring circuitry of this type is well known in the photographic art and is disclosed in various U.S. patents, one of which is U.S. Pat. No. 4,159,870, which is also assigned to the assignee of the present invention.

A film advance mechanism 36 advances film automatically after it is exposed. The mechanism 36 includes a film-metering pawl 38 for positioning film for exposure. A normally open film-metering switch $S_2$ is held closed by the pawl 38 when it is positioned between film notches located seriatim along an edge portion of the film strip, and the switch $S_2$ is open when the pawl is located within a film notch, i.e., the pawl is registering film for exposure. The condition of the switch $S_2$ provides a binary electrical input signal to a conventional microprocessor 40, the operation of which is described in detail hereinbelow.

A motor 42 constitutes energizable means for sequentially actuating the shutter 30 for an exposure, and the film advance mechanism 36, for advancing film after exposure. The shutter 30, the film advance mechanism 36, and the motor 42 form a highly automated system for effecting a photographic cycle. A system of that type is fully described in the aforementioned U.S. Pat. No. 4,361,387, the disclosure of which is incorporated herein by reference.

In accordance with the present invention, the camera 10 and the flash unit 14 include an automatic rangefinder for measuring the distance between the camera and a subject to be photographed, and means for regulating the operation of the converter 15 to limit the charging of the capacitor 18 to a voltage corresponding to flash illumination that is necessary to effect a predetermined flash exposure of a subject situated at the distance measured by the rangefinder. While the present invention is described with regard to a fixed-focus camera, it should be understood that the ranging provided by the rangefinder could also be used for causing the adjusting of the lens 12 for establishing a sharp focus of subject image on the exposure plane of the camera 10.

Still referring to FIG. 2, an automatic rangefinder 44 measures camera-to-subject distance. The rangefinder 44 could be any of a variety of ranging devices, known in the photographic art, of the type which provides an output voltage, the amplitude of which is substantially linearly related to subject distance. U.S. Pat. No. 4,299,464, which is assigned to the assignee of the present invention, discloses one form of a ranging device of this type.

The aforementioned microprocessor 40 operates to regulate the converter 15 to limit the charging of the capacitor 18 to a voltage corresponding to flash illumination that is necessary to effect a predetermined flash exposure of a subject situated at a distance measured by the rangefinder 44. For the microprocessor 40 to operate in that manner, data corresponding to ambient light intensity, camera-to-subject distance, and the charged condition of the flash unit 14 are converted to digital format, for processing by the microprocessor.

An analog multiplexer 46 provides multiplexed output voltages to an analog to digital (A/D) converter 48. These voltages are electrical analogs of ambient light intensity, camera-to-subject distance, and the voltage across the flash-firing capacitor 18.

The A/D converter 48 converts these voltages to digital data, then transfers this data to an interface unit 50 for temporary storage in internal registers (not shown). The data stored in the interface unit 50 are sent across a data bus 52 to storage locations (not shown) in the microprocessor 40.

A program storage unit 54 contains program instructions for causing the microprocessor 40 to control the orderly transmittal of output voltages from the multiplexer 46 to the A/D converter 48, the sequencing of digital data corresponding to these voltages from the converter 48 through the interface unit 50, and the performing of arithmetic and logic operations on the data stored in the microprocessor.

Although not particularly shown, the microprocessor 40 includes a decode-and-control unit for decoding program instructions received from the program storage unit 54, a clock for providing timing pulses, an arithmetic and logic unit for performing data arithmetic and logic operations, a register for receiving input data from the interface unit 50 through an input buffer, address buffers for supplying program storage 54 with the address from which to fetch instructions, accumulators for handling frequently manipulated data, etc.

The description of the multiplexer 46, the A/D converter 48, the interface unit 50, the program storage 54, and in particular the microprocessor 40 is limited to that which is necessary to enable any person skilled in the art to practice the invention. Further descriptive material relating to microprocessors and interface apparatus is widely available such as, for example, Microprocessors and Microcomputers, by B. Soucek, (Wiley, 1976), and Minicomputers for Engineers and Scientists, Gravino Korn (1973), the disclosures of which are incorporated herein by reference.

A further feature of the present invention is that the flash unit 14 initially charges automatically to a minimum voltage that is necessary to fire the flash tube 20, so that the entire charging that is necessary to cause a given flash exposure does not occur after subject distance is measured. This initial charging occurs in response to the readying of the camera 10 in anticipation of the implementing of a photographic cycle.

Prior to the first exposure, the camera 10 is readied to implement a photographic cycle when a pivotally mounted cover 60 (FIG. 1) is moved to uncover the camera, and a film-loading door 61 (also FIG. 1) is closed. After the first and subsequent exposures, the camera 10 is readied to implement a photographic cycle when the film advance mechanism 36 has advanced film for the next exposure. In each situation, the converter 15 is automatically enabled by the microprocessor 40 and charges the capacitor 18 to the aforementioned minimum voltage.

A post 62 is resiliently biased outwardly in the forwardly facing wall of the camera 10. When the cover 60 is in a camera-covering position, it depresses the post 62, and when the cover 60 is moved to a camera-uncovering position, the post 62 is released. The closing of the door 61, or the moving of the cover 60 to uncover the camera 10, (both illustrated in FIG. 2 by dashed lines), whichever occurs last, causes a pivoted lever 64 to move in the counterclockwise direction under the influence of a spring 66. This movement causes a normally open switch $S_1$ to close. When the switch $S_1$ is closed, battery voltage is applied to various camera circuitry including the converter 15, the light-level measuring circuitry 32, and the microprocessor 40. In response to the application of voltage, the microprocessor 40, under instructions provided by the program storage unit 54, enables the converter 15, which causes charging of the flash unit 14.

When the capacitor 18 of the flash unit 14 becomes charged to the aforementioned minimum voltage, the zener diode 26 conducts. This conduction produces a sudden voltage at the junction 27 between the diode 26 and the resistor 28. That voltage is applied to an input port of the microprocessor 40, which under program instructions supplied by the program storage unit 54, causes the converter 15 to turn off.

A shutter-release member 68 is resiliently biased outwardly in the forwardly facing wall of the camera 10 for pre-exposure movement from its deactuated position 70 to an actuated position 72, both of which are shown in FIG. 2. An exposure cycle is initiated when the member 68 reaches its actuated position 72. However, an actual exposure is delayed until the flash unit 12 is charged to a voltage corresponding to flash illumination that is necessary to effect a given flash exposure of a subject situated at a distance measured by the rangefinder 44.

The camera 10 is aimed at a subject to be photographed, and the shutter-release button 68 is depressed. When the shutter-release member 68 is moved from its deactuated position 70, the automatic rangefinder 44 is immediately enabled. The rangefinder 44 operates and produces its aforementioned output voltage which is proportional to camera-to-subject distance.

Additionally, when the shutter-release member 68 is moved from its position 70, the following sequence of operations takes place. In order to process data corresponding to voltages produced by the light-level measuring circuitry 32, the rangefinder 44, and the charged condition of the flash unit 14, the microprocessor 40, in the appropriate sequence in its program, produces multiplexer channel address select signals on lead 46a. In response to these address select signals, the multiplexer 46 sequentially switches inputs to the A/D converter 48. Thereafter, the A/D converter 48 converts input analog data into digital data. Upon completion of each such A/D conversion process, the converter 48 sends a conversion completion signal to the microprocessor 40 on lead 48a. This completion signal causes the microprocessor 40 in the appropriate sequence in its program to execute a data transfer request on lead 50a to accept data in microprocessor memory (not shown) from the A/D converter through the interface unit 50 on the data bus 52.

Thus, digital data relating to ambient light intensity, as measured by the light-level measuring circuitry 32, subject distance, as measured by the rangefinder 44, and the voltage across the flash-firing capacitor, as measured by the voltage at the junction 24, are loaded into the microprocessor 40. With this data, the microprocessor 40 computes the voltage which is required on the capacitor 18 to produce a predetermined exposure, and regulates the operation of the converter 15 to limit the charging of the flash unit 14 to that voltage.

Figure 3:
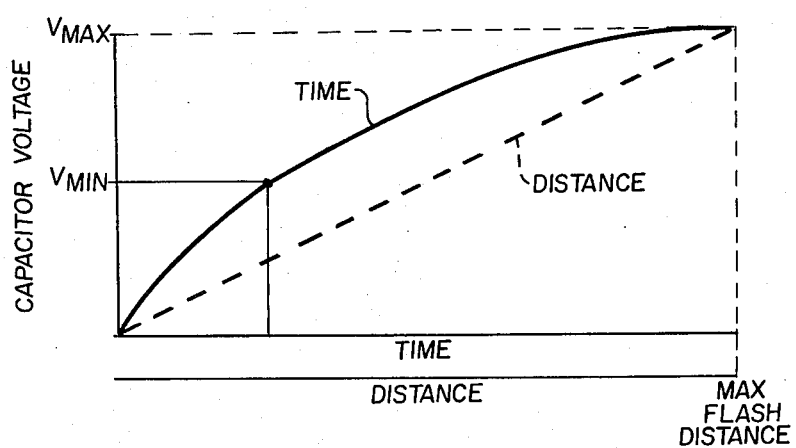
Fig. 3 shows graphs illustrating variation of voltage of a flash-firing capacitor with respect to charging time and photographic distance.

A flash tube produces light which varies as a function of the electrical energy supplied to it. Energy stored by a firing capacitor varies with the square of its voltage. Because the intensity of flash exposure light varies inversely with the square of subject distance, if the distance to a subject to be photographed doubles (which requires quadrupling the light from the flash tube), capacitor voltage must be approximately doubled to quadruple light output. Thus, the voltage required to illuminate a subject to a given level varies in direct proportion to subject distance. This is illustrated in FIG. 3. Also shown in FIG. 3 is the time required by the converter 15 to charge the capacitor 18 to various flash-firing voltages. The voltage, $V_{MIN}$, is the aforementioned minimum voltage that is necessary to fire the flash tube 20.

The microprocessor 40 may be programmed to control the charging of the flash unit 14 to produce a desired exposure that is due solely to flash illumination, or it may be programmed to control flash charging to produce the desired exposure that is a combination of flash and ambient illumination. In the latter case, a variable ratio of fill-in flash illumination to ambient illumination may readily be controlled as a function of ambient light intensity.

Using data corresponding to subject distance and data corresponding to ambient light intensity, if a fill-in flash exposure is desired, the microprocessor 40 computes the voltage to which the capacitor 18 should be charged to produce the desired exposure. The microprocessor 40 then causes the converter 15 to turn on to charge the capacitor 18. As the flash unit 14 charges, the voltage across the capacitor 18 increases substantially exponentially.

In a preferred embodiment, the voltage at the junction 24, which corresponds to the voltage of the capacitor 18, is detected and applied to an input of the multiplexer 46. The microprocessor 40, under program instructions supplied by the program storage unit 54, causes the voltage at the junction 24 to be periodically applied to the A/D converter 48 for conversion to digital format for loading into microprocessor memory. Thus, the microprocessor 40 monitors the charge condition of the flash unit 14 as the voltage on the capacitor 18 increases. The microprocessor 40 then causes the converter 15 to turn off when the capacitor 18 is charged to the voltage necessary to produce the desired exposure of a subject situated at the distance measured by the rangefinder 44.

In an alternative preferred embodiment, the microprocessor 40 is programmed to control the charging of the flash unit 14 based upon a charging time which is predetermined in accordance with the timewise variation in capacitor voltage, as shown in FIG. 3. Unlike the above preferred embodiment, the microprocessor 40 does not use data corresponding to the actual voltage of the capacitor 18 to control flash charging. Instead, the microprocessor 40 either has preselected data loaded in a memory, representing capacitor voltage as a function of charging interval, or the microprocessor 40 has program instructions representing equations which predict voltage of the capacitor 18 as a function of charging time, or vice versa. In this alternative embodiment, the microprocessor 40, as before, computes the voltage to which the capacitor 18 should be charged using data corresponding to subject distance, and, if desired, data corresponding to ambient light intensity. Then, relying upon the timewise variation in capacitor voltage, shown in FIG. 3, the microprocessor 40 computes the time interval required to charge the capacitor 18 to the desired level. The microprocessor 40, under program instructions and using its internal clock, causes the converter 15 to turn on then off when the computed charging interval has elapsed.

Under most picture-taking circumstances, it can be expected that a camera operator would actuate the shutter-release member 68 only a relatively short time after either of the aforementioned events relating to the readying of the camera 10 to implement a photographic cycle. Any charge which may have leaked from the capacitor 18 during the intervening time the converter 15 was off would be at the most very slight. Thus, the charging of the flash unit 14 in response to the actuation of the shutter-release member 68 would only be necessary to raise the voltage on the capacitor 18 from near $V_{MIN}$ to the final desired voltage corresponding to subject distance.

In synchronism with the microprocessor 40 again causing the converter 15 to turn off, the microprocessor 40 causes activation of a current driver 74 so long as the shutter-release member 68 has moved to its actuated position 72. With driver 74 activated, the motor 42 is energized to cause the shutter 30 to operate to expose film in the camera 10. When the shutter 30 is operated, it closes a normally open flash synchronization switch $S_3$. This triggers the flash tube 20, which causes the capacitor 18 to discharge through the tube. Thus, flash illumination is produced that corresponds to voltage stored on the capacitor 18.

The shutter 30 closes to terminate the exposure. This may occur either because the shutter has a predetermined exposure speed, or by means of the microprocessor 40, which, at the appropriate time in its program, deactivates the current driver 74.

After the shutter 30 closes to terminate the exposure, the motor 42 causes the film metering pawl 38 to be removed from its film notch. This causes the film-metering pawl 38 to close the film-metering switch $S_2$. When the switch $S_2$ is closed, ground is applied to an input port of the microprocessor 40. The microprocessor 40, at the appropriate time in its program, activates the current driver 74 to cause the film advance mechanism 36 to advance film for the next exposure. As the film advances and becomes aligned with the camera's exposure plane, the pawl 38 drops into the next film notch, thereby reopening the film-metering switch $S_2$. The microprocessor 40 senses this change in the condition of the switch $S_2$ and deactivates the current driver 74, thereby deenergizing the motor 42.

After film has been advanced for the next exposure, the microprocessor 40, under the control of its program, causes the DC to DC converter 15 to turn on, to recharge the flash unit 14 to the aforementioned $V_{MIN}$. The terminating of the charging of the flash unit 14 after exposure is identical to the terminating of flash charging prior to the first exposure, when the cover 60 is moved to uncover the camera 10, and film is loaded in the camera. Accordingly, further descriptive details of this phase of the charging process are not included.

The invention has been disclosed in detail with reference to preferred embodiments thereof, but it will be understood that variations and modifications can be effected within the spirit and scope of the invention. For example, the microprocessor 40 may be programmed so that charging of the flash unit 14 is prevented whenever the rangefinder 44 measures a subject distance that is beyond the maximum distance of the flash unit.

What is claimed is:

1. a photographic apparatus including (i) a camera having a release member mounted for pre-exposure movement from a first to a second position at which a photographic cycle is initiated, and an automatic rangefinder, responsive to pre-exposure movement of said release member, for producing an electrical signal corresponding to the distance between said camera and a subject to be photographed, and (ii) electronic flash apparatus having a flash tube, a firing capacitor arranged to discharge through said flash tube to produce an amount of flash illumination corresponding to voltage stored by said capacitor, and charging circuitry for selectively charging said capacitor, the improvement comprising:

circuit means, operatively connected to said rangefinder and said charging circuitry and responsive to the aforementioned signal, for causing said charging circuitry to limit the charging of said capacitor to a voltage corresponding at least to subject distance, to provide flash illumination that is necessary to effect a predetermined flash exposure of a subject located at the distance measured by said rangefinder.

2. Photographic apparatus as claimed in claim 1 further comprising light-responsive means for producing a light-dependent signal corresponding to ambient light intensity, and wherein said circuit means is additionally responsive to the light-dependent signal for causing said charging circuitry to limit charging of said firing capacitor to a voltage that is functionally related to both ambient light intensity and subject distance, to provide flash illumination that is necessary to effect a predetermined flash exposure of a subject located at the distance measured by said rangefinder.

3. In a photographic apparatus including (i) a camera having means for producing a first electrical signal in response to an event relating to the readying of said camera for a photographic operation, a release member mounted for pre-exposure movement, after occurrence of such an event, from a first to a second position at which a photographic cycle is initiated, an automatic rangefinder responsive to pre-exposure movement of said release member for producing a second electrical signal corresponding to the distance between said camera and a subject to be photographed, and an operatable shutter for regulating an exposure interval, and (ii) electronic flash apparatus having a voltage-responsive flash tube, a firing capacitor arranged to discharge through said flash tube to produce an amount of flash illumination corresponding to voltage stored by said capacitor, a charging circuit for converting a relatively low voltage to a relatively high voltage for storage by said capacitor, and means for energizing said flash tube in synchronism with operation of said shutter, the improvement comprising:

(a) circuit means, operatively connected to said first electrical signal producing means, said rangefinder, and said charging circuit, and responsive to the first electrical signal for causing said charging circuit to limit the charging of said capacitor to a predetermined minimum voltage, and responsive to the second electrical signal for causing said charging circuit to limit the charging of said capacitor to a voltage corresponding to flash illumination that is necessary to cause a predetermined flash exposure of a subject situated at the distance measured by said rangefinder; and (b) said circuit means further being responsive to the last-mentioned voltage when said release member is in its second position, for causing said shutter to operate.

4. Photographic apparatus as claimed in claim 3 wherein said first electrical signal producing means produces the first electrical signal, prior to an initial photographic cycle, in response to loading film into said camera, and wherein said first electrical signal producing means produces the first electrical signal, prior to each subsequent photographic cycle, after energization of said flash tube.

5. In photographic apparatus having an automatic rangefinder, responsive to actuation of said photographic apparatus for an imminent exposure, for producing an electrical signal corresponding to the distance to a subject to be photographed, a flash tube, a firing capacitor arranged to discharge through said flash tube to produce an amount of flash illumination corresponding to a voltage stored by said capacitor, and charging circuitry for charging said capacitor, the improvement comprising:

circuit means, operatively connected to said rangefinder and said charging circuitry and responsive to the aforementioned signal, for regulating said charging circuitry to limit the charging of said capacitor to a voltage corresponding to subject distance, to provide the flash illunination that is necessary to effect a predetermined flash exposure of a subject located at the distance measured by said rangefinder, said circuit means being further responsive, following energization of said flash tube, to an event prerequisite to a subsequent exposure for causing said charging circuitry to charge said capacitor to a predetermined minimum voltage.

* * * * *